UNITED STATES PATENT OFFICE.

GEORGE E. DUNTON, OF NEW YORK, N. Y.

METHOD OF TREATING WAX FOR USE IN THE ART OF ELECTROTYPING.

1,099,492. Specification of Letters Patent. Patented June 9, 1914.

No Drawing. Application filed November 2, 1910. Serial No. 590,394.

*To all whom it may concern:*

Be it known that I, GEORGE E. DUNTON, residing at New York city, county of New York, State of New York, a citizen of the United States, have invented certain new and useful Improvements in Methods of Treating Wax for Use in the Art of Electrotyping; and I do hereby declare the following to be a full, clear, and exact description of the invention, such as will enable others skilled in the art to which it pertains to make and use the same.

My invention relates to a new and improved method of treating beeswax, ozocerite wax or like material used in compositions employed in making molds in the art of electrotyping. In the art of electrotyping one of the greatest sources of trouble is the molding wax or the material in which the impressions are taken in forming the molds and into which molds the deposits of metal are made said deposits forming the basis of the plates produced. The trouble is caused by the presence of a very appreciable percentage of a fat, grease, fatty, greasy or oily substance in the waxes used as the basis or forming the bulk of substance of which molding material is made.

In molding compositions of which ozocerite or mineral wax constitute the bulk paraffin or petroleum are present, and in molding compositions of beeswax, olein and palmitin are present. These substances are more or less viscous at ordinary temperatures exhibiting the properties of capillarity and penetrating porous substances when heated with avidity. They also penetrate readily the various clays and minerals.

There is a very marked affinity between grease and graphite or the "blackleads" so-called, used in the art of electrotyping. Graphite will not only absorb its fill of grease but will become covered or incased with grease as well. This fact, before my researches and discoveries, being unknown to the electrotyper has caused him no end of trouble, and like an unseen foe could strike a blow and he, the electrotyper, could make no defense, because he knew not from whence the attack came.

In the art of electrotyping it is necessary to resort to very great pressures in the making of the molds. This is done by means of the so-called "hydraulic" or "hydrostatic" presses which develop three thousand five hundred pounds to the square inch of mold surface under pressure.

The molding composition is generally composed largely of ozocerite wax with the addition of a very small percentage probably not over two of gum. This is poured in a molten state over thin sheets of metal, copper or lead composition and allowed to cool. These sheets of metal are laid flat on suitable tables having raised edges or rims around the edges. When the wax is cooled it is shaved and has its surface polished then the surface is brushed over with a powder composed of graphite and lamp black, when it is ready for the impression.

The form which may be set up types, type and cuts or cuts, from which it is desired to obtain duplicates is prepared by cleaning the surface with some detergent and drying and brushing it over very lightly with plain graphite, this latter insures the relieving of the original from the wax or prevents the original sticking to the wax and tearing the face of the mold.

The mold having been made it must be further prepared to receive the deposit of metal by having the surface of the wax made conductive so that it may be included in and form a part of the electric circuit necessary to the deposition of the metal. While this sheet of metal has been formed and has become sufficiently thick it is removed from the wax, receives a backing of a composition metal, lead, tin and antimony becoming then the electrotype plate.

Upon a careful examination and close comparison with the original, especially in the case of a fine half-tone, the electrotype will be found to have lost some of the values of the dots, said dots being shorter than those of the original. Their tops rounding, lacking the flattened surface of the original at the point or termination of the dot.

The reason for the above condition is due to the fact that the polishing graphite or the commonly so-called black lead used in polishing the mold, make the surface of the wax conductive, clings, sticks or adheres to the wax especially in the bottom of the dot portions of the impressions. Instead of the deposit of metal going to the bottom of the dot, it takes place over this filling of graphite. The reason for this condition is that in subjecting the wax to the enormous pressure necessary to force the original to the desired and required depth in the wax to give sharpness to the compression, it compresses the strata of wax directly under the original, expressing or squeezing the fatty element or the grease out of the wax body and causing it to collect in the very deepest parts of the impressed surface of the mold or the faces of the dots. When the polishing graphite is brushed over or beaten into these dots by the machine brushes or blown in by the force of the air blast, it absorbs the grease and is in turn held in the dot by the cohesion of the grease, piling up one particle upon another so long as the influence of the grease is manifest.

My method consists in taking beeswax, ozocerite wax or like material and converting the grease, oil or oily substance, which forms a part of the structure of the wax, into a non-greasy body by subjecting the wax to the action of a suitable chemical substance, such for instance as an alkali, and heating said substances by steam, gas or other suitable means, said non-greasy body being caused to mix with the wax and become incorporated therein during the process of heating. The chemical substance above referred to is preferably composed of a combination of borax and caustic soda the proportion being about 4 ounces of caustic soda and two ounces of borax.

What I claim is:—

1. The method of treating molding material for use in forming molds in the art of electrotyping, consisting in heating the molding material and the grease or oily substance contained therein to a degree of heat sufficient to melt the same, subjecting the melted grease or oily substance, while contained in the molding material, to a substance which will convert it into a non-greasy substance and cause it to penetrate and blend with the molding material, without affecting the structure or consistency of the body of the composition of which the molding material is composed, substantially as described.

2. The method of treating molding material for use in forming molds in the art of electrotyping, consisting in converting the grease or oily substance contained in the molding material into a non-greasy substance by heating said molding material and the grease or oily substance therein to a degree sufficient to melt the same and subjecting the melted grease or oily substance while contained in the molding material to the action of a chemical grease converting substance while the molding material is in a melted state, without changing the structure or consistency of the molding material, substantially as described.

3. The method of treating molding material for use in forming molds in the art of electrotyping, consisting in converting the grease or oily substance contained in the molding material into a non-greasy substance, by heating said molding material and the grease or oily substance contained therein to a degree sufficient to melt the same and subjecting the grease or oily substance, while contained in the melted molding material, to the action of a substance which will cause it to be converted into a substance devoid of grease or oily substance and penetrate the molding material, thereby producing a molding material free from grease or oily substance, substantially as described.

In testimony whereof, I affix my signature in the presence of two witnesses.

GEORGE E. DUNTON.

Witnesses:
H. BEEKER,
F. S. DUFF.